US 010919429B2

(12) United States Patent
Cole et al.

(10) Patent No.: US 10,919,429 B2
(45) Date of Patent: Feb. 16, 2021

(54) DISPENSARY VEHICLES

(71) Applicants: Maury D. Cole, San Diego, CA (US);
Kim N. Wilcox, Ontario, CA (US)

(72) Inventors: Maury D. Cole, San Diego, CA (US);
Kim N. Wilcox, Ontario, CA (US)

(*) Notice: Subject to any disclaimer, the term of this patent is extended or adjusted under 35 U.S.C. 154(b) by 46 days.

(21) Appl. No.: 16/410,330

(22) Filed: May 13, 2019

(65) Prior Publication Data

US 2019/0351802 A1 Nov. 21, 2019

Related U.S. Application Data

(60) Provisional application No. 62/672,532, filed on May 16, 2018.

(51) Int. Cl.
| *B60P 3/025* | (2006.01) |
| *B60P 3/00* | (2006.01) |
| *B60J 5/04* | (2006.01) |
| *F41H 5/26* | (2006.01) |

(52) U.S. Cl.
CPC .............. *B60P 3/0257* (2013.01); *B60J 5/047* (2013.01); *B60P 3/007* (2013.01); *F41H 5/263* (2013.01); *B60R 2300/101* (2013.01); *B60R 2300/8006* (2013.01); *B60R 2300/8073* (2013.01)

(58) Field of Classification Search
CPC ....... B60P 3/025; B60P 3/0255; B60P 3/0257; B60P 1/43; B60P 1/435

USPC .................................................... 296/21, 22
See application file for complete search history.

(56) References Cited

U.S. PATENT DOCUMENTS

| 2004/0055345 A1* | 3/2004 | Moore ................. B65D 90/021 70/257 |
| 2006/0049198 A1* | 3/2006 | Guard ................... B60P 3/0257 221/24 |
| 2007/0187483 A1* | 8/2007 | Romary ............. G06Q 20/1085 235/379 |
| 2015/0158608 A1* | 6/2015 | Talarico .................. G07F 13/10 53/440 |
| 2018/0099602 A1* | 4/2018 | Salter ........................ F21V 9/30 |

FOREIGN PATENT DOCUMENTS

| CN | 202130358 | * | 2/2012 | .............. B60P 3/00 |
| CN | 202130358 U | | 2/2012 | |
| KR | 2003-0016775 | * | 3/2003 | ............. B60P 3/025 |
| KR | 2003-0016775 A | | 3/2003 | |

OTHER PUBLICATIONS

International Search Report and Written Opinion dated Jul. 23, 2019 for related International Application No. PCT/US2019/032146, in 13 pages.

* cited by examiner

*Primary Examiner* — Dennis H Pedder
(74) *Attorney, Agent, or Firm* — Procopio, Cory, Hargreaves & Savitch, LLP; Lisel M. Ferguson

(57) ABSTRACT

Secure vehicles and methods for transporting and dispensing products are provided herein.

17 Claims, 4 Drawing Sheets

DISPENSARY VEHICLES

CROSS-REFERENCE TO RELATED APPLICATIONS

This application claims priority to U.S. Provisional Application No. 62/672,532, filed May 16, 2018, entitled "DISPENSARY VEHICLES," the contents of which are hereby incorporated by reference in their entirety.

FIELD OF THE INVENTION

The field of the invention is vehicles. More specifically, the field of the invention is secure dispensary vehicles and methods relating thereto.

BACKGROUND

Convenience is an important factor in making purchasing decisions. Many consumers are willing to pay high delivery fees and wait long periods of time simply in order to avoid traffic, lines or crowds. With certain products, privacy is also an important consideration. Many people would prefer to have certain items delivered to a specific location, or to pick up items from a relatively distant location, in order to avoid being seen purchasing the items by their neighbors or friends. With some products, it can be very important that the products do not end up in the wrong hands, for example, with prescription medicine. Furthermore, with highly desirable products that are not easy to obtain, there are safety risks involved in purchasing, selling or supplying the products.

Unfortunately, there are many instances of theft and other damage to property and persons involved in purchasing, selling, delivering or otherwise supplying certain products such as prescription drugs and marijuana goods. Thus, there is still a need for improved delivery or dispensary vehicles and methods related thereto.

SUMMARY OF THE INVENTION

The inventive subject matter provides a vehicle comprising a vehicle body, one or more doors configured to move between open and closed positions, and coupled to one or more surveillance cameras such that a movement of a door relative to the vehicle body moves a position of a surveillance camera relative to the vehicle body, and one or more product dispensary units positioned partially or entirely behind the one or more doors when the doors are in closed positions. It should be appreciated that the cameras or portions thereof (e.g., the camera bases) may be mounted or otherwise positioned on at an outer surface of the door, within the inner door space, or a combination thereof. In some aspects, a door may be coupled to the vehicle body such that the door opens upwardly to form a cover or canopy. The doors may be coupled to the vehicle body in any suitable manner, including for example, via one or more hinges. Each door has an outer side and an inner side, and one or more cameras may be coupled to at least one of the outer side and the inner side of the door. As used herein, an outer surface is the external surface of the entire door, an outer side is the side of the door having an external surface that is visible from outside of the vehicle when the door is closed, and an inner side is the side of the door opposite the outer side that faces the product dispensary unit(s). The area between the outer side and inner side can be considered the inner door space. Contemplated cameras include, among other things, box cameras, dome cameras, PTZ cameras, bullet cameras, IP cameras, day/night cameras, thermal cameras, wide dynamic security cameras, and wireless cameras.

The product dispensary units may include various features for holding and dispensing products of one or more dispensaries, wholesalers, manufacturers or retailers. Exemplary products that could be dispensed via contemplated vehicles include marijuana, medications, and prescription compositions. A product dispensary unit may include one or more user interfaces that allow a user to initiate, complete or otherwise further a transaction, Contemplated user interfaces include a pin pad or touch pad to make a selection or complete a purchase transaction via a debit or credit card, and a screen for viewing product offerings that can be selected through the pin pad, touch pad, screen or other interface. The product dispensary unit may also include a product release button for releasing the product from a cassette or other open or sealed unit or compartment within the product dispensary unit, and a scale for confirming a weight of the product before or upon release. Additionally or alternatively to a scale, the product dispensary unit may include a counter for counting the number of items (e.g., pills), or other suitable mechanism to confirm that the right product or the right quantity or weight of a product will be dispensed. Such mechanisms can include a camera or other sensor. Where included, a user friendly display interface such as a screen or monitor may be positioned in front of the products carried in the product dispensary unit(s), and can be considered a part of the product dispensary unit, or a separate item that is placed in front of the product dispensary unit. Thus the screen can be considered to be, for example, positioned between the door and the product dispensary unit when the door is closed, or to be a part of the product dispensary unit itself. Suitable display interfaces may include a touchscreen and allow customers to view additional items available for purchase, enroll in a loyalty program or mailing list, or see featured products or new releases.

It is also contemplated that dispensaries, distribution centers, wholesalers, manufacturers, retailers, customers or others may be able to track inventory and sales, as well as the location of the vehicles in real time through mobile applications, websites including user portals, or the like.

Various objects, features, aspects and advantages of the inventive subject matter will become more apparent from the following detailed description of preferred embodiments, along with the accompanying drawing figures in which like numerals represent like components.

BRIEF DESCRIPTION OF THE FIGURES

The accompanying figures, which are incorporated in and constitute a part of the specification, illustrate embodiments of the invention and, together with the description, serve to explain the objects, advantages, and principles of the invention. In the drawings.

DETAILED DESCRIPTION OF THE INVENTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIGS. 1-4 show vehicles of the inventive subject matter having numerous features that provide convenience and enhanced protection to customers purchasing products such as marijuana products, operators of the vehicles, and the suppliers of products. Although only certain features are shown included in each of the figures illustrated, it should be appreciated that a vehicle of the inventive subject matter could include one, some, or even all of the features described herein. It should also be appreciated that a vehicle of the inventive subject matter could include any suitable number of each of the features.

The vehicles described herein provide safety and privacy features not included in previously known dispensary trucks (e.g., marijuana dispensary trucks). In some aspects, products are not delivered directly to the consumers, for example at their home addresses, which minimizes the risk of robbery and theft. It is contemplated that the user will be able to select a pick-up point from vehicles in multiple locations. Audio and video surveillance systems may be included to track and monitor activity at each location and allow personnel to report any suspicious behavior to a security team and the local police department. The vehicles described herein may advantageously be designed similarly to armored vehicles, and may include features such as bulletproof windows, 4-way surveillance cameras on all four corners of the vehicle, a satellite dish for improved internet connectivity, and GPS tracking and remote monitoring features to ensure the safety of customers, providers, and the vehicles themselves. Electronic doors may also be included, which may be operated both by remote control and a switch in the truck, preferably an internal switch for added safety.

Figure 1:
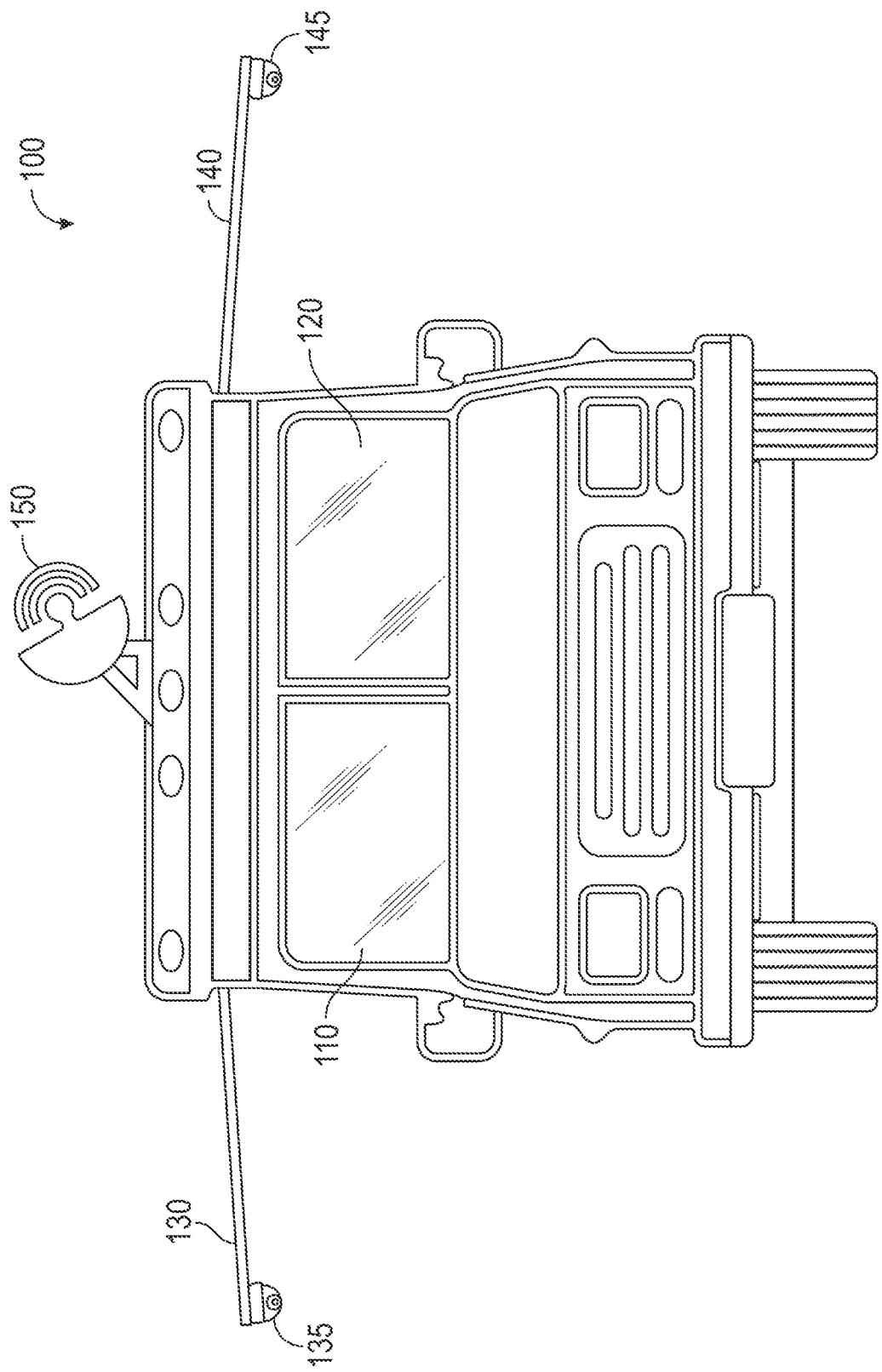
FIG. 1 illustrates a front view of a first embodiment of a dispensary vehicle of the inventive subject matter.

In FIG. 1, dispensary vehicle 100 includes side panel door 130 coupled to surveillance camera 135, and side panel door 140 coupled to surveillance camera 145. The side panel doors 130, 140 may be configured to open upwardly to reveal at least one of a product dispensary unit and a monitor as further described below. It should be appreciated that each side panel door can include or be coupled with any suitable number of cameras. In some preferred vehicles, each side panel door or set of side panel doors on a side of the vehicle will be coupled to at least 2 security cameras (or even 3, 4, 5, or more cameras). Side panel doors 130, 140 may further include or be coupled with magnetic/electromagnetic door locks for added security. Such lock may keep the products in the vehicle safe by, for example, securely keeping the doors 130, 140 closed with over 500 lbs (e.g., 600 lbs, 1200 lbs, at least 550 lbs, at least 700 lbs, at least 900 lbs, at least 1200 lbs) of holding force until released manually or through a security system. The door locks can optionally include failsafe emergency release capabilities (unlock when de-energized), or be fail-secure (remain locked in the event power is lost). Additionally or alternatively, side panel doors can include other suitable door locks, including mechanical locks. Vehicle 100 further includes bulletproof windows 110, 120, and a satellite dish 150 for improved internet connectivity.

Figure 2:
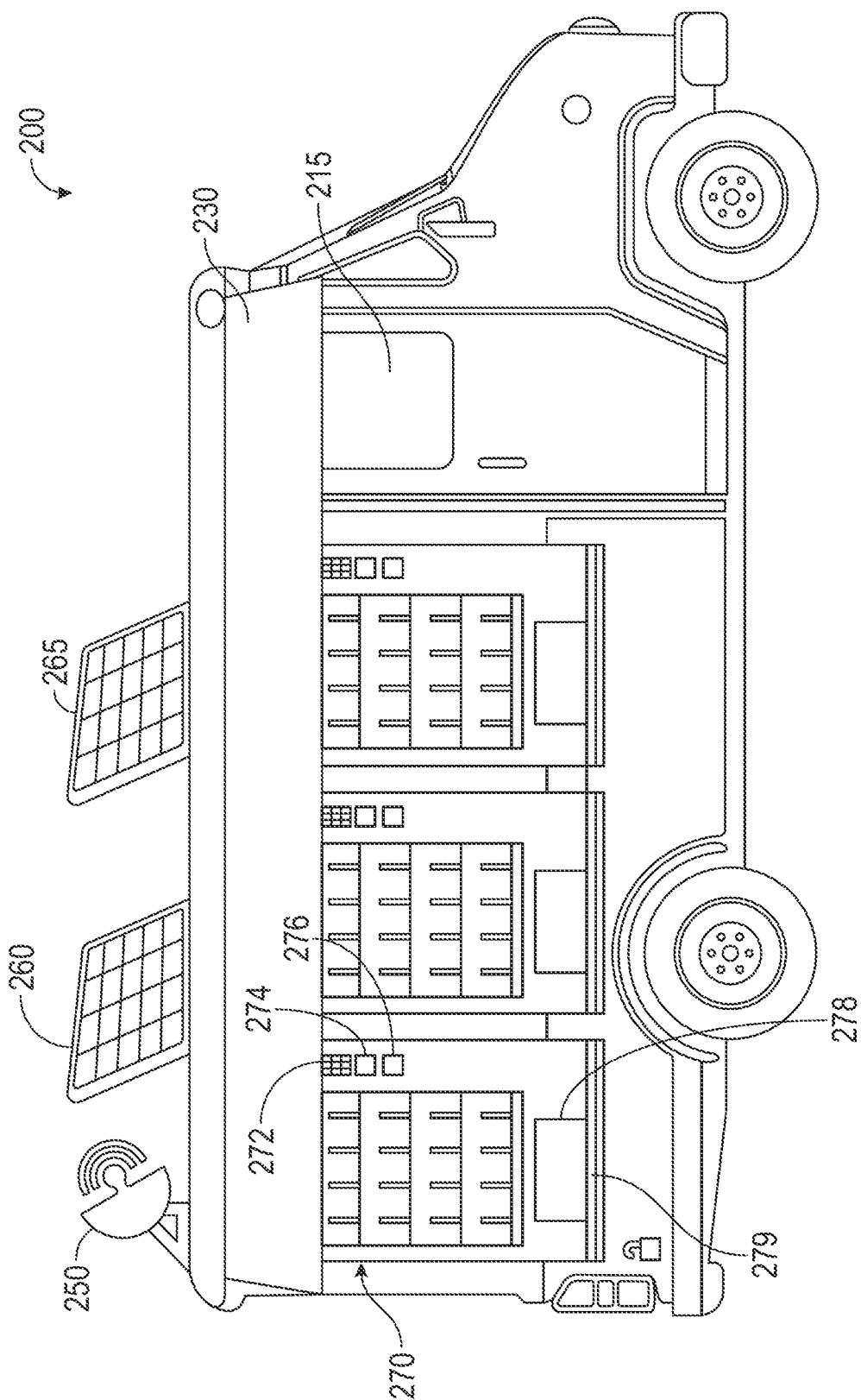
FIG. 2 illustrates a right side view of a vehicle of the inventive subject matter.

In FIG. 2, a right side of a dispensary vehicle 200 is shown. Dispensary vehicle 200 includes side panel doors (e.g., 230), a satellite dish 250, bulletproof windows (e.g., 215) similarly to vehicle 100. It should be appreciated that right side of vehicle 200 could be the right side of vehicle 100, or vehicles 100 and 200 could be considered different embodiments. Additionally, vehicle 200 includes solar panels 260, 265 to provide a primary or auxiliary source of power, and product dispensary units (e.g., 270), which comprises a user interface (here, a pinpad) 272 and card receiving slot 274 that allows a user to complete online purchase transactions via a debit or credit card or verify an identify of the user, a printer 276 for printing customer receipts upon completion of a transaction or upon request, and a product release button 278 that is configured to cause a product to drop from a cassette or other container onto a scale 279 that confirms a weight of the product being released. A push release or other door could be included to allow a customer to retrieve a product.

It should be appreciated that vehicles of the inventive subject matter could include any suitable number of product dispensary units including any suitable number of cassettes or cartridges or products. For example, a vehicle may include three product dispensary units, each configured to hold 360 pieces of product (for example in 20 cartridges) for a total of 1080 products per vehicle. As another example, a vehicle may include six product dispensary units, each configured to hold 360 pieces of product for a total of 2160 products per vehicle. Each dispensary case unit could have a scale underneath such that when the product drops it will automatically weigh the product and update the weight of the remaining product in each product dispensary unit.

Each product dispensary unit could require two or more keys to be opened for improved security. In some preferred methods, product dispensary units will only be opened twice daily: once at the beginning of the business day when the cases are stocked and loaded by the distribution center employee; and again at the end of the day when end of day processing is completed by the distribution center employee and the vehicle operation employee. One key could be kept with the security team of the vehicle operation, and the other key could be kept at the distribution center such that it could only be opened when a distribution center employee and a vehicle operation employee are present to open a case for quality control purposes. Products are generally packaged individually and sealed by dispensary employees prior to pick up. The dispensary employees may stock each individual product dispensary unit or cassette, and sign off on quantity and value of product for each dispensary unit or cassette. The vehicle operation employee could also sign off electronically upon receiving the quantity and approving the monetary value. It is contemplated that products from multiple dispensaries or retailers could be included in a single vehicle. For example, each cartridge or set of cartridges within a product dispensary unit could be used by a different retailer to hold their products.

Figure 3:
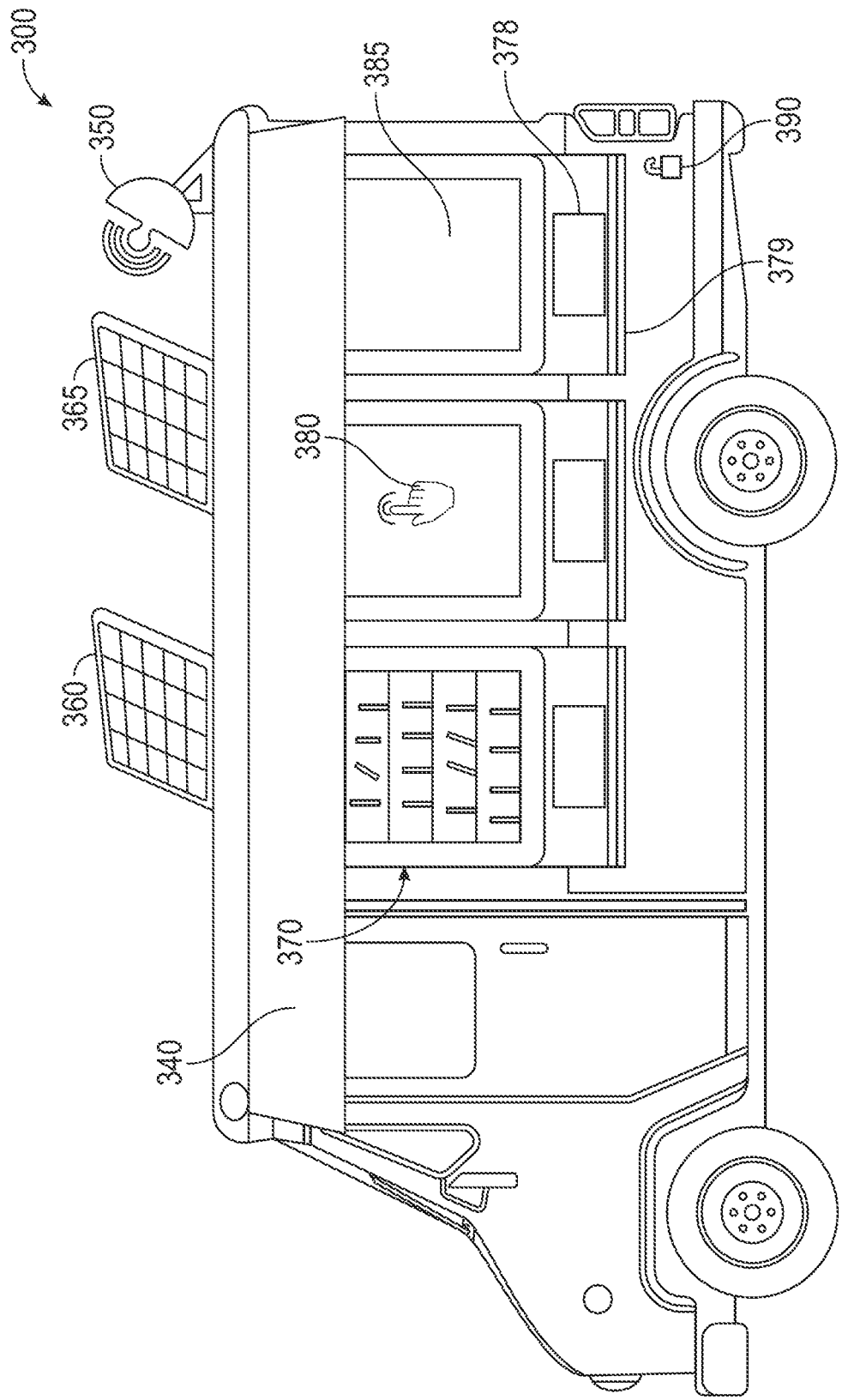
FIG. 3 illustrates a left side view of a vehicle of the inventive subject matter.

In FIG. 3, dispensary vehicle 300 includes side panel doors (e.g., 340), a satellite dish 350, two solar panels 360, 365, and product dispensary units (e.g., 370) including product release button 378 and scale 279 similarly to vehicle 200. Furthermore, vehicle 300 includes touchscreens 380 and 385, which is positioned in front of the product dispensary units. It should be appreciated that left side of vehicle 300 could be the left side of vehicle 100, or vehicles 100 and 300 could be considered different embodiments.

Each product dispensary unit may include touchscreen monitors, or be positioned behind or near a touchscreen monitor, to allow users to at least one of browse selections and promotions or discounts, place orders and complete pickup orders. Among contemplated touchscreen monitors include 20-50 inch monitors (e.g., 30 inch monitors) with a complete menu of products to choose from. The customer may see a photographic menu of each item offered. The touchscreen allows the customer to select the items they want to purchase and complete their transaction with a touch of a button or portion of the screen. The menu may offer a variety of products, including marijuana products, CBD oils, edibles, and e-Vape products.

The touchscreen menu creates a user-friendly connection to customers from the moment an online account is setup. The ease-of-use of the touchscreen monitors makes the vehicle the preferred distribution method for many customers and other users (e.g., franchisees).

Still further, vehicle 300 includes a magnetic lock, electromagnetic lock or locking magnetic strip 390 (also illustrated in FIG. 2). As noted above, such lock may keep the products in the vehicle safe by, for example, securely keeping the doors closed with over 500 lbs of holding force until released manually or through a security system.

Figure 4:
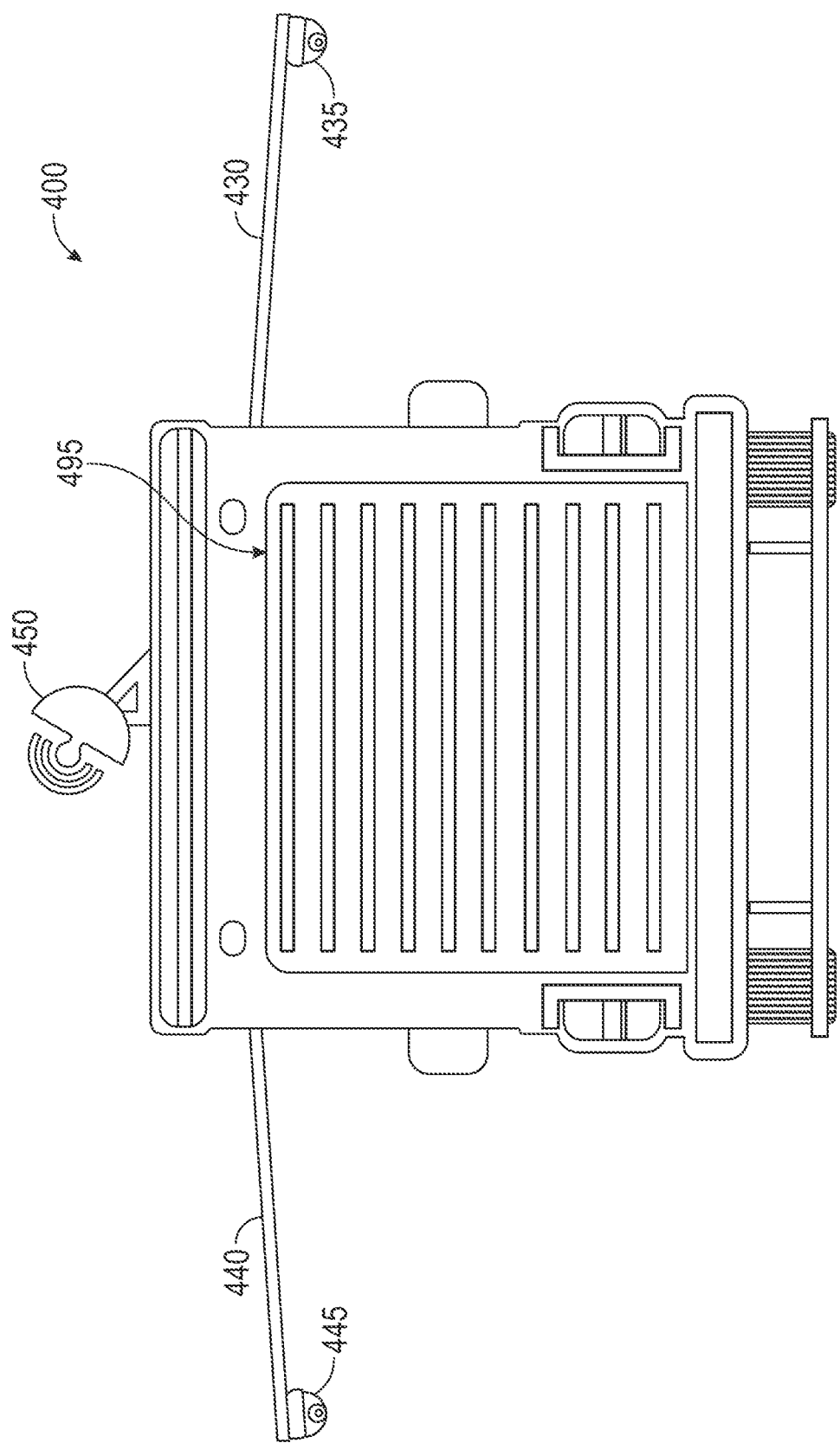
FIG. 4 illustrates a rear view of a vehicle of the inventive subject matter.

In FIG. 4, dispensary vehicle 400 includes side panel doors 430, 440, surveillance cameras 435, 445, and a satellite dish 450 similarly to vehicle 100. Furthermore, vehicle 400 includes a rear ramp door 495. Door 495 may be configured to open to form a ramp for easy loading and unloading of product dispensary units and cassettes. It should be appreciated that the rear of vehicle 400 could be the rear side of vehicle 100, or vehicles 100 and 400 could be considered different embodiments.

Customer Platform

Contemplated distribution and delivery processes may be managed electronically using an application similar to QuickBooks™. Such business management software tools can have various functionalities, including accounting, payroll, payment processing, and inventory, payment and time-tracking functionalities. The customer platform, which can be accessed via a webpage, a mobile app and the like, would allow new customers to set up accounts, and place product orders in a safe, confidential environment. When the customer places an order online, they would receive a confirmation number which can be used when they get to the dispensary vehicle to complete the transaction and pick up their product. In some aspects, cash transactions may be prohibited at marijuana or other dispensary vehicles for the safety of the customers and employees. To complete the transaction, the customer could approach one of the product dispensary units, enter their confirmation number via a user interface, and receive the dispensed product upon charge to the customer's account. Once the transaction is complete, some or all of the funds relating to the transaction may be electronically transferred to the distribution center.

Distribution Center Platform

The distribution center platform, which could also be accessed via a website, mobile application and the like, could include an accounting and sales tracking function, as well as an inventory management function and any other suitable function. To access the accounting and sales function, the distribution center employee may log in via a website of software application, and select a designated folder, for example a Sales & Accounting folder. The folder may allow the distribution center to track hourly, daily, weekly, and monthly sales, and to track and monitor sales transactions deposited into their bank account.

A designated folder, for example an inventory management folder, may track and monitor inventory from the marijuana dispensary vehicle directly to the distribution center in real time for quality assurance purposes. At the end of the business day, the marijuana dispensary vehicle may return to the distribution center to process and reconcile end of day inventory quantity and total sales for the day.

MDV Platform

The Marijuana Dispensary Vehicle platform (MDV platform), which can also be accessed via a website, mobile app and the like, may include a Sales & Accounting type folder or function as described above, and an inventory management folder or function as described above. Furthermore, the MDV platform may include a franchise tracking function that allows a user to track daily sales for each truck, each retailer, each distributor, or the like in any suitable manner.

Purchaser Benefits

The vehicles described herein provide safety to the customers who are able to purchase their products safely through transactions online at a location of their selection, which can be close or far away from their home, friends, and co-workers. The vehicles also advantageously provide safety to third parties who are unable to accidentally obtain and consume products not suitable for them (e.g., prescription medications not prescribed to them). In some contemplated methods, transactions initiated through the customer platform would be in a pending status until the customer arrives at the MDV location, enters their authorization code and completes the transaction. Receipts may be available if the receipt option is chosen by the customer. Since the process is done electronically and there is no cash option in some embodiments, enhanced safety is provided to the customer, the distribution center and its employees, and for the mobile dispensary vehicle and its employees. Indeed there is no need for the MDV employee or driver to come into contact with a customer unless additional identification verification is required.

A unique feature of contemplated vehicles and methods is the security that they provide for the customer, for the distribution center supplier and for the MDV Company. Each of the three parties in the transaction wants to feel protected and that their security is monitored, which the vehicles and methods herein provide (e.g., through the electronic tracking system, the electronic payment system, on site security guards, and security cameras). Additionally, packages are not delivered to the customer's home, reducing any potential concerns relating to strangers knowing where they live, or neighbors knowing about their purchases.

It is contemplated that various other features may be provided to enhance the customer experience, including (a) options to view or be notified of vehicle location schedules, product specials, new product offerings, order information, receipts, etc. via text message, mobile app or webpage, (b) loyalty program memberships, or (c) vouchers to receive free samples of new products, among other things.

A benefit for the distribution center is that the vehicles contemplated herein can hold 10 to 20 times more product in a more secure environment. All transactions are monitored electronically and the distribution center has the ability to track transactions, remaining product, and income remotely using the distribution center platform or system.

Furthermore, it is contemplated that distribution centers may replenish orders for the vehicle based on agreed upon quantities and sales prices, and track orders and inventory in real time.

Orders could be tracked on the MDV platform or system, which could also communicate with the distribution Center's system and the customer platform or system. Inventory could also be managed on the MDV platform or system and communicate in real time with the distribution center's platform or system. Viewed from another perspective, it is contemplated that the consumer, MDV and distribution center platforms or systems are communicatively coupled to one another.

The distribution center would be granted access and be able to track how much product is sold, and how much product is left in each of the MDVs. The distribution center can also track and monitor the amount of revenue going into their account each day, and track which MDV is responsible for what percentage of the revenue. The distribution center can also choose an option to use their proprietary system where the MDV will have limited access to transfer account information and inventory tracking information to the distribution center daily or at any other predetermined frequency.

At the end of the business day the MDV may return to the distribution center to reconcile accounts and return unsold packages to the distribution center. A distribution center employee may unload their merchandise, and process return inventory quantity sign off via the distribution center platform upon receiving it. A vehicle employee may also log-in and sign off on the inventory quantity and confirm that the inventory quantity was correct via the MDV platform.

It is contemplated that an option for the vehicle to be parked at the distribution center location overnight may be provided. The following day, the distribution center employees can process new orders for the day. The distribution center employee and the MDV employee may verify quantity and cost of the order and sign off electronically on a computer.

Thus, specific dispensary vehicles and related methods have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

What is claimed is:

1. A vehicle, comprising:
   a vehicle body;
   a door configured to move between open and closed positions, and coupled to a surveillance camera such that a movement of the door relative to the vehicle body moves a position of the surveillance camera relative to the vehicle body; and
   a product dispensary unit positioned at least partially behind the door when the door is in the closed position and comprises a set of products, wherein the product dispensary unit comprises:
      a product release area into which the product dispensary unit dispenses one or more products of the sets of products; and
      at least one of a scale and a counter disposed in the product release area, wherein the at least one of a scale and a counter receives the one or more products and confirms at least one of a weight or a count of the one or more products.

2. The vehicle of claim 1, wherein the door is coupled to the vehicle body such that the door is configured to open upwardly.

3. The vehicle of claim 1, wherein the door comprises an outer side and an inner side, and wherein the camera is coupled to the inner side.

4. The vehicle of claim 1, wherein the product dispensary unit further comprises a user interface.

5. The vehicle of claim 4, wherein the product dispensary unit further comprises a set of sealed units for holding the set of products.

6. The vehicle of claim 1, comprising a monitor positioned between the door and the product dispensary unit when the door is in the closed position.

7. The vehicle of claim 1, further comprising a solar panel.

8. The vehicle of claim 1, further comprising a satellite dish.

9. The vehicle of claim 1, further comprising a bulletproof window.

10. The vehicle of claim 1, wherein the door at least one of comprises and is coupled to a magnetic lock.

11. The vehicle of claim 1, further comprising a rear ramp door that at least one of comprises and is coupled to a magnetic lock.

12. The vehicle of claim 1, further comprising:
    a second door configured to move between open and closed positions, and coupled to a second surveillance camera such that a movement of the second door relative to the vehicle body moves a position of the second surveillance camera relative to the vehicle body; and
    a second product dispensary unit positioned at least partially behind the second door when the second door is in the closed position.

13. The vehicle of claim 6, wherein the monitor is a touch screen monitor.

14. The vehicle of claim 13, wherein the monitor is configured to display a set of products a user may obtain from the product dispensary unit.

15. The vehicle of claim 4, wherein the user interface comprises a monitor.

16. The vehicle of claim 4, wherein the user interface comprises a touch pad.

17. The vehicle of claim 10, wherein the magnetic lock is configured to lock the door with more than 500 pounds of force.

* * * * *